United States Patent [19]

Cipriano et al.

[11] Patent Number: 4,929,521

[45] Date of Patent: * May 29, 1990

[54] SOLID ELECTROLYTE BATTERY

[75] Inventors: Robert A. Cipriano, Lake Jackson; R. Vernon Snelgrove, Damon; Francis P. McCullough, Jr., Lake Jackson, all of Tex.

[73] Assignee: The Dow Chemical Company, Midland, Mich.

[*] Notice: The portion of the term of this patent subsequent to Dec. 12, 2006 has been disclaimed.

[21] Appl. No.: 265,653

[22] Filed: Nov. 1, 1988

Related U.S. Application Data

[63] Continuation-in-part of Ser. No. 250,789, Sep. 28, 1988, Pat. No. 4,886,715, which is a continuation-in-part of Ser. No. 4,003, Jan. 16, 1987, abandoned, which is a continuation-in-part of Ser. No. 3,974, Jan. 16, 1987, abandoned.

[51] Int. Cl.$^5$ .............................................. H01M 6/18
[52] U.S. Cl. .................................. 429/102; 429/104; 429/192; 429/112
[58] Field of Search ............... 429/103, 198, 104, 191, 429/192, 218, 102

[56] References Cited

U.S. PATENT DOCUMENTS

| | | | |
|---|---|---|---|
| 3,428,493 | 2/1969 | Adams | 429/112 |
| 3,847,667 | 11/1974 | Werth | 429/103 |
| 3,870,561 | 3/1975 | Charbonnier et al. | 429/102 |
| 4,005,183 | 1/1977 | Singer | 423/447.2 |
| 4,285,831 | 8/1981 | Yoshida et al. | 423/447.2 |
| 4,539,277 | 9/1985 | Ishigaki et al. | 429/249 |
| 4,592,973 | 6/1986 | Pemsler et al. | 429/249 X |
| 4,631,118 | 12/1986 | McCullough et al. | 204/16 |
| 4,707,423 | 11/1987 | Kalnin et al. | 429/112 |

Primary Examiner—Anthony Skapars

[57] ABSTRACT

An electric storage device comprising an anode, a cathode and an electrolyte comprising the lithium salt of an aliphatic acid having 10 to 24 carbon atoms.

10 Claims, 2 Drawing Sheets

SOLID ELECTROLYTE BATTERY

RELATED APPLICATION

This application is a continuation-in-part of application Ser. No. 250,789 filed Sept. 28, 1988 of McCullough et al, now U.S. Pat. No. 4,886,715 which is a continuation-in-part of application Ser. No. 004,003, filed Jan. 16, 1987, and application Ser. No. 003,974, filed Jan. 16, 1987 of McCullough et al both now abandoned.

FIELD OF THE INVENTION

The present invention relates to novel solid polymeric electrolytes and to primary energy storage devices containing the electrolytes. More particularly, the invention is concerned with an electrolyte comprising the lithium salt of an organic acid and to primary rechargeable energy storage devices with such electrolytes.

BACKGROUND OF THE INVENTION

The combination of relatively high theoretical energy density, potentially long life, and low cost materials such as reported in the sodium-sulfur system high temperature batteries has been reported in the literature as suitable for low rate performance work such as electric road vehicle propulsion or load leveling of electric power supplies. The sodium-sulfur systems, first proposed in 1966, has had a great deal of effort expended in trying to develop a practical system. The basic operating principle involves the separation of two active molten materials, sodium and sulfur, by either a ceramic membrane of beta alumina or sodium glass, which at about 300° C. or higher allows the passage of sodium ions that form with the sulfur any of the several polysulfides. The open circuit voltage of the system is at just over 2 volts, about the same as the lead-acid cell. Two formidable problems exist at the present time, viz., cracking of the separator and corrosion of the casing and seal.

Another somewhat similar system is the lithium-iron sulfide system, operating at about 450° C. However, insufficient development has been done to date to demonstrate the widespread practicality of this system.

Another of the developments being pursued involves a lithium-based cell, in which the negative electrode is a lithium alloy (typically either lithium-aluminum or lithium-silicon), the positive electrode is an iron sulfide, and the electrolyte is a molten salt, such as the eutectic composition in the lithium chloride-potassium chloride system. Because of the high melting point of such salts, such cells must be operated in the temperature range of 400–500 degrees centigrade.

This requirement to operate at such high temperatures has several important disadvantages. One of these is that various degradation processes, such as corrosion of the cell container, seals, and other components are accelerated by such high temperatures. Another is that a substantial amount of energy is lost through heat transfer to the surroundings. Still another is that the voltage obtained from such cells is lower at elevated temperatures, due to the fundamental property of the negative temperature dependence of the free energy of the cell reaction. Furthermore, the higher the temperature of operation, the greater the potential problems related to damage to the cell during cooling to ambient temperature and reheating, whether deliberate or inadvertent. Differences in thermal expansion, as well as dimensional changes accompanying phase changes, such as the freezing of the molten salt, can cause severe mechanical distortions, and therefore damage to cell components.

Cells involving a lower temperature molten salt electrolyte have been investigated where the molten salt is based upon a solution of aluminum chloride and an alkali metal chloride. However, such salts are not stable in the presence of the respective alkali metals. As a result, an auxiliary solid electrolyte must be used to separate the alkali metal and the salt. One example of such a cell involves a molten sodium negative electrode, a solid electrolyte of sodium beta alumina, a molten aluminum chloride-sodium chloride salt, and either antimony chloride or an oxychloride dissolved in the chloride salt as the positive electrode reactant.

Such a cell can operate in the temperature range 150–250 degrees centigrade. It has the disadvantage of having to employ an electrolyte, which increases the cell impedance, as well as adding to the cost and complexity.

U.S. Pat. No. 4,751,161 to James et al discloses a non-aqueous lithium electrochemical cell utilizing lithium salts and an inorganic solvent mixture.

U.S. Pat. No. 3,844,837 to Bennion et al discloses a nonaqueous battery in which the anode may be lithium and/or graphite on which lithium metal is deposited and as a positive electrode a platinum cup filled with powdered $K_2SO_4$ and graphite is utilized. The electrolytes disclosed are $LiClO_4$, $LiCF_3SO_3$ or $LiBF_4$ dissolved in dimethyl sulfite.

SUMMARY OF THE INVENTION

In accordance with the present invention there is provided a novel electrolyte comprising the lithium salt of an organic acid and a primary-rechargeable storage device having at least one cell positioned in the housing together with said electrolyte. The cell comprises a pair of electroconductive electrodes electrically insulated from contact and the novel electrolyte comprising the lithium salt of an organic acid.

The cathode or positive electrode may comprise a carbonaceous electrically conductive fibrous or sheet material, graphite, any of the conventional metal or metal oxide electrodes, for example zinc, cadmium, aluminum, platinum, etc. Preferably, the cathode comprises fibrous carbonaceous material which is associated with a current collector. Advantageously, the carbonaceous material comprises an activated carbon fabric.

The anode or negative electrode may comprise an alkaline earth or alkali metal, exemplified by calcium, potassium, strontium, lithium, potassium, and sodium, as well as low melting alloys and/or alkali eutectic mixtures thereof which contain the aforesaid alkali metals as the predominate constituent. Preferably the anode is lithium or lithium containing eutectics of Ca, Si, K, Ba, Ag, Zn and Al. The melting point of lithium is about 175° C. to 180° C.

A separator encapsulates the anode. The separator must be capable of transporting or passing ionic species, e.g., alkaline earth or alkali metal ions and electrically isolating the anode from the cathode. The encapsulated anode electrode is positioned within a housing which is capable of containing the metal anode in its molten state and is at least moisture impervious.

The electrolytes of the invention comprise the lithium salt of aliphatic acids having 10 to 24 carbon atoms, preferably 12 to 16 carbon atoms. Advantageously, the electrolytes comprise lithium salts of aliphatic acids such as lauric acid, myristic acid, palmitic acid, stearic acid, arachidic acid, behenic acid and lignoceric acid.

The preferred electroconductive carbonaceous cathode material used in the invention is more fully described in copending application Ser. No. 558,239, entitled Energy Storage Device, filed Dec. 15, 1983 now abandoned and Ser. No. 678,186, entitled Secondary Electrical Energy Storage Device and an Electrode Therefore, filed Dec. 4, 1984, now U.S. Pat. No. 4,865,931, each by F. P. McCullough and A. F. Beale, which applications are incorporated herein by reference in their entirety. Simply, the preferred carbonaceous material is a fiber spun from stabilized polymeric material such as pitch based material or polyacrylonitrile based fibers. These fibers are stabilized by oxidation and thereafter made electroconductive by carbonization at temperatures of above 850° C., and preferably above 1700° C. Advantageously, the carbonaceous fibers have a Young's Modulus of greater than about one million psi, and preferably about five million psi. The upper limit for practical manufacturing is about 100 million psi, although as production techniques improve it may be possible to use a material which has a higher Young's Modulus. However, such material is at present considered to be much too brittle to withstand manufacture into electrodes, as well as, the rigors of use to which a battery may be subjected. The carbonaceous material should have sufficient strength to withstand the encapsulation without loss of electrical contact between the carbon particles. Thus, one can employ a carbonaceous material defined in the foregoing application as well as many other forms of electroconductive carbons such as GRAFOIL when they are encapsulated in the manner hereinafter described.

The separator may be non-conductive carbonaceous fibers or a non-conductively coated metallic screen of metals which include steel, silver, platinum, etc., for example having a coating of $Li_3N$ or a cationic polymer stable in the environment of use.

The carbonaceous electrode, when constructed as a cloth or sheet, includes an electron collector conductively associated with the carbonaceous fibers or sheet. The electrode conductor interface is preferably further protected by a material to insulate the collector and to substantially protect the electron collector from contact with the electrolyte and its ions. The protective material must, of course, be unaffected by the electrolyte and its ions.

The current collector intimately contacts the carbonaceous material of the electrode. The carbonaceous material may be in the form of an assembly such as a planar cloth, sheet or felt. It is also envisioned that the electrode may be constructed in other shapes such as in the form of a cylindrical or tubular bundle of fibers. It is also apparent that an electrode in the form of a planar body of cloth, sheet or felt can be rolled up with a separator between the layers of the carbonaceous material, and with the opposed edges of the rolled up material, connected to a current collector. While copper metal has been used as a current collector, any electroconductive metal or alloy may be employed, such as, for example, silver, gold, platinum, cobalt, palladium, and alloys thereof. Likewise, while electrodeposition has been used in bonding a metal or metal alloy to the carbonaceous material, other coating techniques (including melt applications) or electroless deposition methods may be employed.

Suitable techniques for preparing the collector/carbonaceous material negative electrode are more fully described in co-pending application Ser. No. 729,702, entitled Improved Low Resistance Collector Frame for Electro-conductive Organic and Graphitic Materials, filed May 2, 1985, by F. P. McCullough and R. V. Snelgrove, now U.S. Pat. No. 4,631,116.

BRIEF DESCRIPTION OF THE DRAWINGS

The present invention will be better understood from the following description of preferred embodiments of the invention together with the accompanying drawings wherein.

DETAILED DESCRIPTION OF THE PREFERRED EMBODIMENTS

Figure 1:
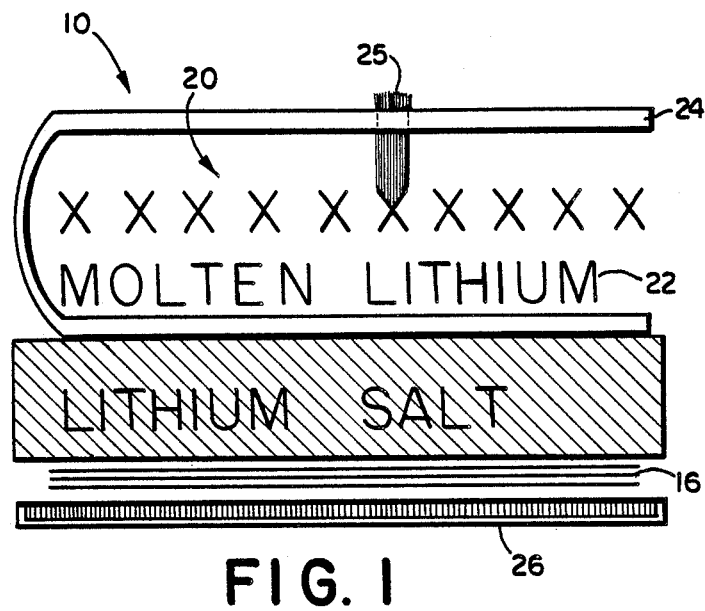
FIG. 1 is a schematic side elevational view, in cross-section, of an embodiment of the invention.

Referring to FIG. 1, a cell 10 within a housing (not shown) includes an anode assembly comprising an expanded metal matrix 20 in which an alkali metal or alkaline earth metal, for example, lithium 22 in the liquid state is retained.

A separator 24 encloses the anode assembly with a bipolar connector 25 passing through the separator 24. The separator 24 preferably comprises a cationic polymer, $Li_3N$ or $Li_3N$ coated on a metallic screen, for example a carbon steel screen.

The cathode comprises a graphite cloth 16 that is placed adjacent a bipolar plate 26, which is preferably aluminum. The cloth advantageously has a bulk density which is normally expected for carbon fibers. Also included is an electrolyte comprising a lithium salt of an organic acid, for example lithium laurate.

In order to bring the battery to its optimum operating temperature when the anode is a metal such as lithium, which is about 200° C. to 300° C., there is provided a heater (not shown).

Figure 2:
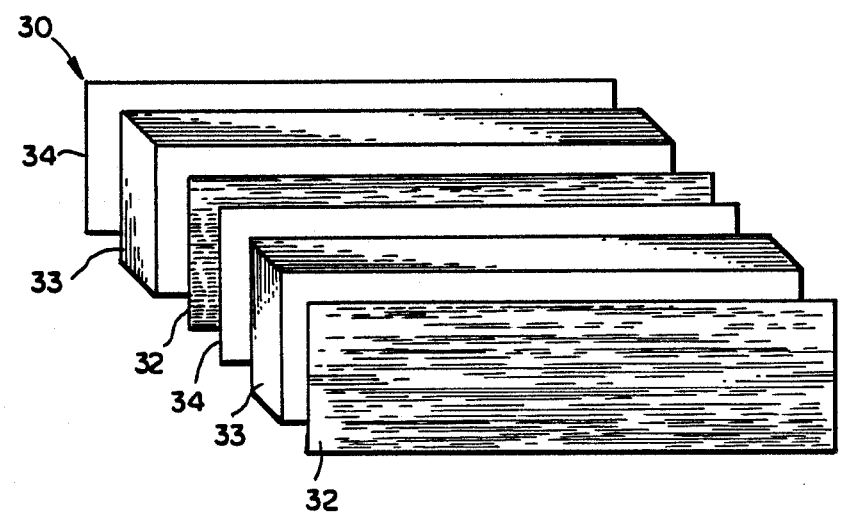
FIG. 2 is a partially broken away view of a flat plate multi-cell bipolar battery of the invention.

In order to keep the internal resistance and the battery weight low, the battery 30 comprising bipolar thin plates as shown in FIG. 2. FIG. 2 illustrates a multi-cell assembly 30 showing two series connected cells separated by a bipolar plate connector 32 which is a 0.003" thick aluminum. The density of the aluminum is about 2.7 g/cc. It is to be understood that the assembly 30 can include any number of cell units by use of additional bipolar separators and cell units. The assembly 30 includes cathode and anode plates 33 and 34. The anode 34 comprises a steel screen coated with a film of $Li_3N$ which contains about 2.5 times the stoichrometric amount of lithium metal.

The cathode plate 33 comprises a 0.08 cm thick graphite cloth electrode having a bulk density of about 0.645 g/cc and lithium laurate comprises the electrolyte.

It is understood that the units are physically bonded to each other so as to become a unitary structure.

Energy devices which are contained in fluid-tight housings are generally known in the art. Such housings may be suitably employed in the present invention as long as the housing material is preferably electrically non-conductive or at least insulated from contact with one electrode and is impervious to gases and/or moisture (water or water vapor).

Housing materials which may be utilized are the conventional housing systems for high temperature batteries which include metallic, ceramic, and composites of the two groups, and the like.

In addition to being compatible, a housing material may also offer an absolute barrier (less than about 0.2 grams of $H_2O/yr/ft^2$ or 0.02 grams of $H_2O/yr/m^2$) against the transmission of water vapor from the external environment of the housing in order to prolong life. No presently known thermoplastic materials alone offers this absolute barrier against moisture at a thickness which would be useful for a battery housing. At present only metals, for example aluminum or steel, offer an absolute barrier against moisture at foil thicknesses. Aluminum foil having a thickness of greater than 0.0015 in. (0.038 mm) has been shown to be essentially impervious to water vapor transmission. It has also been shown that when laminated to other materials, aluminum foil as thin as 0.00035 in. (0.009 mm) can provide adequate protection against water vapor transmission. Suitable housings made of metal-plastic laminate, CED-epoxy-coated metal (cathodic electro deposited), or metal with an internal liner of plastic or glass presently satisfies the requirements for both chemical compatability and moisture barrier ability. Most of the cells and batteries built to date have been tested in either a dry box having a $H_2O$ level of 5 ppm, a glass cell or a double walled housing with the space between the walls filled with an activated molecular sieve, e.g. 5A zeolite.

The following examples are beaker cell experiments to demonstrate the principles of the present invention.

EXAMPLE 1

A single strand of carbon fiber yarn was taken from a woven Panex PWB6 cloth (manufactured by Stackpole). This woven cloth was reported to have been heat treated to about 1500° C. by Stackpole. This single strand of carbon fiber yarn was immersed in a steel crucible containing a molten lithium salt of lauric acid. A steel mesh screen of a pore size that the molten lithium would not pass through was filled with molten lithium to provide a negative electrode and inserted into the container. The screen was centered within the container to provide a concentric construction. The carbonaceous electrode which extended over the molten electrolyte was provided with an insulation coated copper wire. The molten lithium contacted the metal screen container to which a second insulated wire was attached.

The cell was assembled in the dry box. A pair of alligator clips were attached. One was attached to the insulated wire attached to the carbonaceous electrode assembly and the other was attached to the screen. An open current voltage of 2.56 volts was measured. A microamp current flowed for several minutes.

EXAMPLE 2

A low carbon steel wire mesh screen was wrapped around a one-half inch in diameter cylindrical rod joined at its edge by a double crimp and at its bottom end in a like manner crimped, thereby to form a cylindrical element. This element was inserted into a one inch crucible which was provided with a Teflon liner. Small pieces of lithium were inserted into the wire mesh basket and melted in place until the wire mesh tube was filled. A piece of woven Panex PWB6 staple yarn was copper plated on one edge, wrapped about a three quarter inch diameter mandrel and the resulting tube inserted between the Teflon liner and the wire mesh tube. A quantity of the lithium salt of lauric acid liquid was poured into the lined crucible filling the space between the liner and the cylindrical element, immersing the negative electrode therein. A small piece of brass rod was inserted into the molten lithium to act as a current collector and a small copper wire was soldered to the copper plate of the carbon electrode, acting as the other lead. An open circuit voltage of about 2.5 volts was measured across the leads. The cell was capable of producing current in the microamp range at a steady voltage for several days. The cell was freeze-thawed at least 5 times without any adverse effects.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. In a primary rechargeable electrical energy storage device comprising at least one cell having an anode, a cathode and a solid electrolyte, the improvement which comprises said electrolyte comprising a lithium salt of an aliphatic acid having 10 to 24 carbon atoms.

2. The storage device of claim 1, wherein said electrolyte comprises the lithium salt of an aliphatic acid having 12 to 16 carbon atoms.

3. The storage device of claim 1, wherein said electrolyte is lithium laurate.

4. The storage device of claim 1, wherein said cathode comprises an electrically conductive carbonaceous material.

5. The storage device of claim 4, wherein said carbonaceous material comprises activated carbon fibers.

6. The storage device of claim 1, wherein said anode comprises a metal selected from the group consisting of alkaline earth metal, alkaline earth metal alloy, alkali metal, alkaline metal alloy, an alkali metal eutectic mixture thereof.

7. The storage device of claim 1, wherein said anode comprises lithium.

8. A primary rechargeable electrical storage device comprising a housing, at least one cell positioned in said housing, each cell comprising an anode consisting of a metal selected from the group consisting of alkaline earth metal, alkaline earth metal alloy, alkali metal, alkali metal alloy and alkali metal eutectic mixtures, a separator surrounding said anode, said separator being capable of transporting or passing ionic species and electrically isolating said anode, a cathode comprising an electrically conductive carbonaceous material, and an electrolyte associated with said cathode, said electrolyte comprising the lithium salt of an aliphatic acid having 10 to 24 carbon atoms.

9. The electric storage device of claim 8, wherein said electrolyte is a lithium salt of an aliphatic acid having 12 to 16 carbon atoms.

10. The electric storage device of claim 8, wherein said electrolyte is lithium laurate.

* * * * *